US012470004B2

(12) United States Patent
Yokotani

(10) Patent No.: US 12,470,004 B2
(45) Date of Patent: Nov. 11, 2025

(54) WIRE HARNESS

(71) Applicant: SUMITOMO WIRING SYSTEMS, LTD., Yokkaichi (JP)

(72) Inventor: Koichi Yokotani, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 183 days.

(21) Appl. No.: 18/257,586

(22) PCT Filed: Dec. 21, 2021

(86) PCT No.: PCT/JP2021/047156

§ 371 (c)(1),
(2) Date: Jun. 15, 2023

(87) PCT Pub. No.: WO2022/138597

PCT Pub. Date: Jun. 30, 2022

(65) Prior Publication Data

US 2024/0113464 A1 Apr. 4, 2024

(30) Foreign Application Priority Data

Dec. 22, 2020 (JP) ................................ 2020-212409

(51) Int. Cl.
*H01R 13/405* (2006.01)
*B60R 16/02* (2006.01)
(Continued)

(52) U.S. Cl.
CPC ....... *H01R 13/405* (2013.01); *B60R 16/0207* (2013.01); *H01B 7/0045* (2013.01); *H01R 13/53* (2013.01); *H01R 2201/26* (2013.01)

(58) Field of Classification Search
CPC ............ B60R 16/0207; B60R 16/0215; H01B 7/0045; H01R 13/405; H01R 13/6581;
(Continued)

(56) References Cited

U.S. PATENT DOCUMENTS 9,414,533 B2 * 8/2016 Yanagihara ...... H01R 13/65912
2015/0050833 A1 * 2/2015 Mizutani ................. B60L 50/16 439/527
(Continued)

FOREIGN PATENT DOCUMENTS

WO 2015034034 A1 3/2015

*Primary Examiner* — Paresh Paghadal

(57) ABSTRACT

First terminals according to an embodiment of the present disclosure are arranged at a first interval in a second direction, and second terminals are arranged at a second interval in the second direction. The first interval differs from the second interval. The electric wires have the same length. The electric wires include first connection portions, respectively connected to the first terminals, and second connection portions, respectively connected to the second terminals. The second connection portions are arranged next to each other in the second direction, and ones of the first connection portions having a longer interval from ones of the corresponding second connection portions in the second direction are arranged at positions closer to the corresponding second connection portions in the first direction.

8 Claims, 4 Drawing Sheets

(51) Int. Cl.
*H01B 7/00* (2006.01)
*H01R 13/53* (2006.01)

(58) Field of Classification Search
CPC ................ H01R 13/64; H01R 13/6593; H01R 13/65912; H01R 2201/26; H01R 11/12
See application file for complete search history.

(56) References Cited

U.S. PATENT DOCUMENTS

| | | | | |
|---|---|---|---|---|
| 2015/0372415 | A1 | 12/2015 | Ishihara et al. | |
| 2016/0255750 | A1* | 9/2016 | Yoshida .................. | H01B 7/04 174/359 |
| 2018/0019544 | A1 | 1/2018 | Ishibashi | |
| 2020/0086248 | A1* | 3/2020 | McCollough ........... | G06F 21/44 |
| 2020/0312485 | A1* | 10/2020 | Yamashita ........... | H01B 7/0275 |
| 2023/0027106 | A1* | 1/2023 | Masuda ............. | H01R 13/6592 |

* cited by examiner

WIRE HARNESS

BACKGROUND

Field of the Disclosure

The present disclosure relates to a wire harness.

Related Art

WO 2015/072335 discloses a wire harness that electrically connects a motor and an inverter of a vehicle. The wire harness includes a first connector connected to the motor, a second connector connected to the inverter, and electric wires electrically connecting the first connector and the second connector.

The first connector includes first terminals arranged next to one another and a first housing holding the first terminals. The second connector includes second terminals arranged next to one another and a second housing holding the second terminals. The first terminals are connected to the second terminals by the electric wires, respectively.

In such a wire harness, for example, the interval between the first terminals may differ from the interval between the second terminals. In this case, the distance between the first terminal and the corresponding second terminal will be different between each set of the first terminal and the second terminal.

Thus, each electric wire will have a different length. This will result in the need to prepare several types of electric wires having different lengths and thus increase the number of types of components in the wire harness.

It is an objective of the present disclosure to provide a wire harness that minimizes the number of component types.

SUMMARY

A wire harness in accordance with the present disclosure includes a first connector, a second connector, and electric wires. The first connector includes a first housing and first terminals. The first housing includes a first opening, and the first terminals are held by the first housing. The second connector includes a second housing and second terminals. The second housing includes a second opening, and the second terminals are held by the second housing. The electric wires connect the first terminals and the second terminals. The first terminals project into the first opening in a first direction and are arranged next to each other at a first interval in a second direction that is orthogonal to the first direction. The second terminals project into the second opening in the first direction and are arranged next to each other at a second interval in the second direction. The first interval differs from the second interval. The electric wires have the same length. The electric wires include first connection portions, respectively connected to the first terminals, and second connection portions, respectively connected to the second terminals. The second connection portions are arranged next to each other in the second direction. Ones of the first connection portions having a longer interval from ones of the corresponding second connection portions in the second direction are arranged at positions closer to the corresponding second connection portions in the first direction.

A wire harness in accordance with the present disclosure includes a first connector, a second connector and electric wires. The first connector includes a first housing and first terminals. The first housing includes a first opening, and the first terminals are held by the first housing. The second connector includes a second housing and second terminals, the second housing includes a second opening, and the second terminals are held by the second housing. The electric wires connect the first terminals and the second terminals. The first terminals project into the first opening in a first direction and are arranged next to each other at a first interval in a second direction that is orthogonal to the first direction. The second terminals project into the second opening in the first direction and are arranged next to each other at a second interval in the second direction. The first terminals are identical in shape. The first interval differs from the second interval. The electric wires include first connection portions, respectively connected to the first terminals, and second connection portions, respectively connected to the second terminals. The second connection portions are arranged next to each other in the second direction. Ones of the first connection portions having a larger interval from ones of the corresponding second connection portions in the second direction are arranged at positions closer to the corresponding second connection portion in the first direction.

The present disclosure minimizes the number of component types.

DETAILED DESCRIPTION

DESCRIPTION OF EMBODIMENTS

Figure 1:
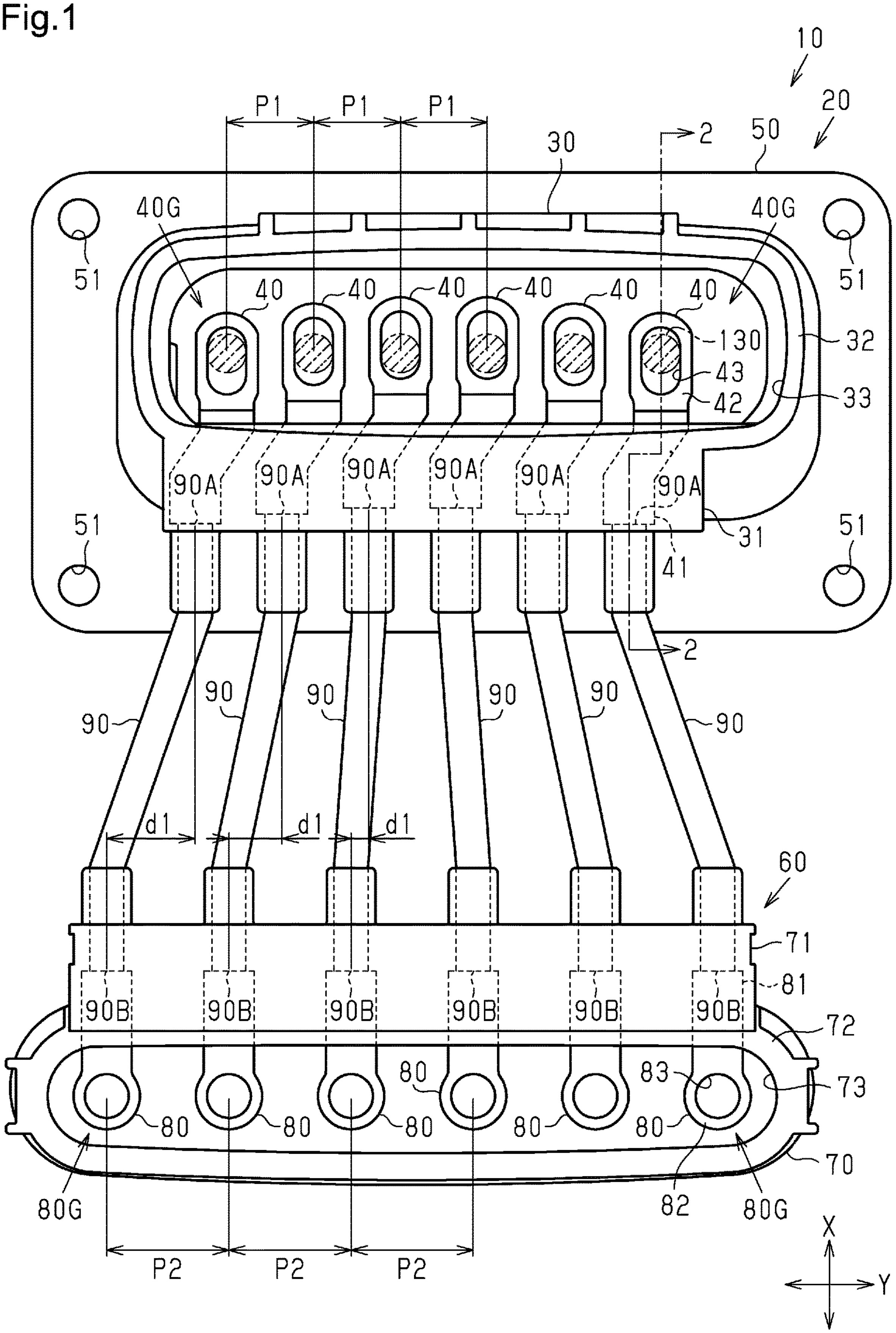
FIG. 1 is a plan view of a wire harness according to an embodiment.

Description of Embodiments of the Present Disclosure

Embodiments of the present disclosure will first be listed and described.

[1] A wire harness in accordance with the present disclosure includes a first connector, a second connector and electric wires. The first connector includes a first housing and first terminals. The first housing includes a first opening, and the first terminals are held by the first housing. The second connector includes a second housing and second terminals. The second housing includes a second opening, and the second terminals are held by the second housing. The electric wires connect the first terminals and the second terminals. The first terminals project into the first opening in a first direction and are arranged next to each other at a first interval in a second direction that is orthogonal to the first direction. The second terminals project into the second opening in the first direction and are arranged next to each other at a second interval in the second direction. The first interval differs from the second interval. The electric wires have the same length. The electric wires include first connection portions, respectively connected to the first terminals, and second connection portions, respectively connected to the second terminals. The second connection portions are arranged next to each other in the second direction. Ones of the first connection portions having a longer interval from ones of the corresponding second connection portions in the second direction are arranged at positions closer to the corresponding second connection portions in the first direction.

For example, in the wire harness in which the first interval and the second interval differ from each other and the first connection portions and the second connection portions are both arranged in the second direction, the length of the electric wire connecting the first terminal and the second terminal increases as the interval in the second direction between the first connection portion and the second connection portion connected by the electric wire increases.

In the structure described above, each electric wire has the same length. In addition, ones of the first connection portions having a longer interval from the corresponding second connection portion in the second direction are arranged at positions closer to the corresponding second connection portion in the first direction. The position of the first connection portion is set in this manner so that electric wires of the same length can be used. This minimizes the number of component types in the wire harness.

[2] Preferably, each of the first terminals includes a distal end connected to a mating terminal, and the distal end projects from the first opening in a third direction that is orthogonal to both the first direction and the second direction.

With such a structure, the distal end of each first terminal projects out of the first opening. This improves the working efficiency when connecting the first terminals to the mating terminals.

[3] Preferably, each of the first terminals includes an insertion hole into which a bolt is inserted for connection with a mating terminal, and the insertion hole is an elongated hole that is elongated in the first direction.

With such a structure, when joining the mating terminal and the first terminal with the bolt, the position of the first terminal relative to the mating terminal can be changed in the first direction. This allows the first terminals to be connected to the mating terminals, which are arranged next to one another in the second direction, even when the first connection portions are located at different positions in the first direction. This absorbs differences in the positions of the first terminals in the first direction resulting from differences in the first interval and the second interval.

Further, with the structure described above, for example, even in a case where the lengths of the electric wires vary within the range of the manufacturing tolerance, the elongated holes of the first terminals absorbs the variation. Therefore, the mating terminal and the first terminal can be properly connected to each other.

[4] Preferably, the first terminals are identical in shape and interchangeable.

With such a structure, multiple types of the first terminals do not have to be prepared. This allows the same type of first terminal to be used, and the same type of electric wire to be used. Thus, the number of component types in the wire harness can be further minimized.

[5] Preferably, the first interval is smaller than the second interval.

Such a structure limits enlargement of the first housing in the second direction. Therefore, enlargement of the first connector in the second direction is limited.

[6] Preferably, the first connection portions are embedded in the first housing, and the second connection portions are embedded in the second housing.

Such a structure imparts water resistance between the electric wires and the first housing, and between the electric wires and the second housing.

[7] Preferably, one of the first connector and the second connector is electrically connected to an inverter; the other of the first connector and the second connector is electrically connected to a motor; and the electric wires are high-voltage electric wires to which high voltage is applied.

With such a structure, the wire harness can be applied to a conductive path between the inverter and the motor to which high voltage is applied.

[8] A wire harness of the present disclosure includes a first connector, a second connector and electric wires. The first connector includes a first housing and first terminals, the first housing includes a first opening, and the first terminals are held by the first housing. The second connector includes a second housing and second terminals, the second housing includes a second opening, and the second terminals are held by the second housing. The electric wires connect the first terminals and the second terminals. The first terminals project into the first opening in a first direction and are arranged next to each other at a first interval in a second direction that is orthogonal to the first direction. The second terminals project into the second opening in the first direction and are arranged next to each other at a second interval in the second direction. The first terminals are identical in shape. The first interval differs from the second interval. The electric wires include first connection portions, respectively connected to the first terminals, and second connection portions, respectively connected to the second terminals. The second connection portions are arranged next to each other in the second direction. Ones of the first connection portions having a larger interval from ones of the corresponding second connection portions in the second direction are arranged at positions closer to the corresponding second connection portion in the first direction.

For example, in the wire harness in which the first interval and the second interval differ from each other and the first connection portions and the second connection portions are both arranged in the second direction, the length of the electric wire connecting the first terminal and the second terminal increases as the interval in the second direction between the first connection portion and the second connection portion connected by the electric wire increases.

In the structure described above, ones of the first connection portions having a larger interval from ones of the corresponding second connection portions in the second direction are arranged at positions closer to the corresponding second connection portion in the first direction. Therefore, when compared with the electric wires of a wire harness in which the first connection portions are aligned in the second direction, the length of the electric wire will be shorter as the distance between the first connection portion and the second connection portion in the second direction becomes longer. As a result, the electric wires can have the same length, and the same type of electric wire can be used. Thus, the number of component types in the wire harness can be reduced.

Detail of Embodiment of Present Disclosure

A specific example of a wire harness of the present disclosure will now be described with reference to the drawings. In the drawings, elements are illustrated for simplicity and have not necessarily been drawn to scale. The present disclosure is not limited to these examples. The scope of the present disclosure and equivalence of the present disclosure are to be understood with reference to the appended claims. In the present specification, the term of "orthogonal" does not mean strictly orthogonal and may also mean substantially orthogonal so as to cover a scope that results in the same advantages as the present embodiment.

Structure of Wire Harness 10

As shown in FIG. 1, the wire harness 10 includes a first connector 20 including first terminals 40, a second connector 60 including second terminals 80, and electric wires 90 electrically connecting the first terminals 40 and the second terminals 80. The wire harness 10, for example, electrically connects devices of a vehicle, such as a motor and an inverter, to each other. The first connector 20 is electrically connected to, for example, the inverter. The second connector 60 is electrically connected to, for example, the motor.

Structure of Electric Wire 90

Figure 2:
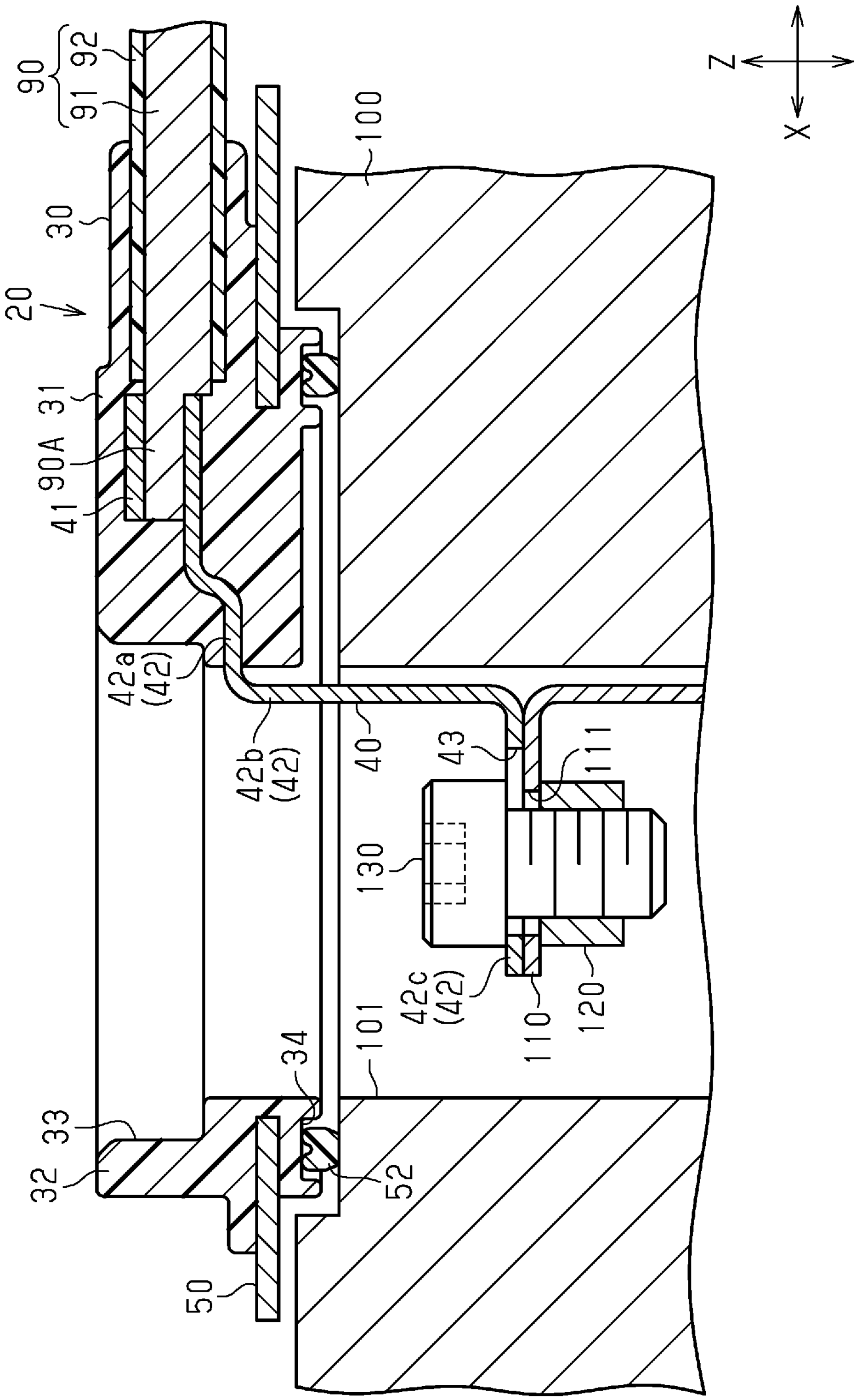
FIG. 2 is a cross-sectional view taken along line 2-2 in FIG. 1.

As shown in FIG. 2, each electric wire 90 includes a wire core 91, formed by a conductor, and an insulating coating 92, coating the surface of the wire core 91. The electric wire 90 is, for example, a high-voltage electric wire to which high voltage is applied. The term "high-voltage electric wire" in this specification is an electric wire that is standardized under "JASO D624 (2015)". The rated voltage of the high-voltage electric wire is greater than 30 V and less than or equal to 600 V for alternating voltage, and greater than 60 V and less than or equal to 750 V for direct voltage.

As shown in FIG. 1, each electric wire 90 includes a first connection portion 90A, connected to the corresponding first terminal 40, and a second connection portion 90B, connected to the second terminal 80. The first connection portion 90A is arranged at one end of the electric wire 90, and the second connection portion 90B is arranged at the other end of the electric wire 90. The wire core 91 is exposed from the insulating coating 92 at the first connection portion 90A and the second connection portion 90B. Therefore, one end of each wire core 91 is connected to the corresponding first terminal 40 at the first connection portion 90A, and the other end of the wire core 91 is connected to the corresponding second terminal 80 at the second connection portion 90B.

The electric wires 90 have the same length. In this specification, "the electric wire 90 haves the same length" includes not only a case where the electric wires 90 have exactly the same length but also a case where the electric wires 90 have lengths that differ slightly within a range of a manufacturing tolerance or an assembly tolerance.

Structure of First Connector 20

As shown in FIG. 2, the first connector 20 is attached to an inverter case 100 including an opening 101.

As shown in FIG. 1, the first connector 20 includes a first housing 30 that holds the first terminals 40. The first connector 20 includes, for example, six first terminals 40. The first terminals 40 are identical in shape and interchangeable.

A metal plate 50 protruding from the periphery of the first housing 30 is arranged integrally with the first housing 30. The plate 50 includes attaching holes 51. Bolts (not shown) for attaching the plate 50 to the case 100 are inserted into each attaching hole 51. The first connector 20 is attached to the case 100 by attaching the plate 50 to the case 100.

Structure of First Housing 30

The first housing 30 includes a holding portion 31 holding the first terminals 40, and a tubular portion 32 having a tubular shape. The housing 30 is formed of, for example, a resin material.

The holding portion 31 protrudes from the tubular portion 32 toward the outer side of the tubular portion 32. The holding portion 31 holds the first terminals 40 and parts of the electric wires 90 including the first connection portions 90A. The first terminals 40, which are connected to the electric wires 90, are integrated with the first housing 30 through insert molding. Therefore, each of the first connection portions 90A is embedded in the holding portion 31.

The tubular portion 32 includes a first opening 33 extending through the tubular portion 32. The first opening 33 is oval.

As shown in FIG. 2, a groove 34 surrounding the first opening 33 is arranged in a portion of the first housing 30 facing the case 100. An annular seal member 52 is arranged in the groove 34 to seal the gap between the first housing 30 and the case 100.

Structure of First Terminal 40

As shown in FIG. 1, the first terminals 40, which project from the holding portion 31 into the first opening 33, and are arranged at first intervals P1. The first interval P1 is the distance in a second direction Y between the central axes of insertion holes 43, which will be described below.

Hereinafter, the direction parallel to the projecting direction of the first terminals 40 is referred to as the first direction X, a direction in which the first terminals 40 are arranged next to each other is referred to as the second direction Y, and a direction orthogonal to both the first direction X and the second direction Y is referred to as the third direction Z. The first direction X, the second direction Y, and the third direction Z are orthogonal to one another.

Each first terminal 40 includes a wire connection portion 41 and a terminal connection portion 42. The first terminal 40 is a single component in which the wire connection portion 41 and the terminal connection portion 42 are formed integrally. The first terminal 40 is formed of, for example, a metal material such as copper, copper alloy, aluminum, aluminum alloy, or stainless steel.

The wire core 91 of each electric wire 90 is electrically connected to the corresponding electric wire connection portion 41. An intermediate part of the electric wire connection portion 41 with respect to the longitudinal direction is bent in a direction intersecting both the first direction X and the second direction Y to extend toward the first opening 33.

As shown in FIG. 2, the terminal connection portion 42 is, for example, plate-shaped. The terminal connecting portion 42 includes a basal end 42*a* extending from the wire connection portion 41 to the inside of the first opening 33 in the first direction X, an intermediate part 42*b* bent from the basal end 42*a* to extending in the opening 101 of the case 100 in the third direction Z, and a distal end 42*c* bent from the intermediate part 42*b* and extending toward the side opposite to the base end 42*a* in the first direction X. The terminal connection portion 42 projects out of the first opening 33 of the first housing 30. In the present embodiment, part of the intermediate part 42*b* and the distal end 42*c* of the terminal connecting portion 42 project out of the first opening 33 in the third direction Z. Therefore, the distal end 42*c* is located outside the first opening 33 and inside the opening 101 of the case 100.

The distal end 42*c* includes the insertion hole 43 that extends through the distal end 42*c* in the third direction Z. The insertion hole 43 is an elongated hole that is elongated in the first direction X. The axial direction of the insertion hole 43 corresponds to the direction in which the first opening 33 extends through the distal end 42C. When viewed in the third direction Z, the insertion hole 43 is entirely overlapped with the first opening 33.

The terminals 40 are electrically connected to metal mating terminals 110 arranged inside the opening 101 of the case 100. The mating terminals 110 are arranged next to one another in the second direction Y (not shown). A circular through hole 111 extends through each mating terminal 110 in the third direction Z. For example, a nut 120, connected to the through hole 111, is attached to the mating terminal 110. A bolt 130 is inserted into the insertion hole 43 of the first terminal 40 and the through hole 111 of the mating terminal 110 and fastened to the nut 120 to join the first terminal 40 and the mating terminal 110.

First Terminal Group 40G

As shown in FIG. 1, the first connector 20 includes one or more first terminal groups 40G of the first terminals 40. The first connector 20 of the present embodiment includes two first terminal groups 40G, each including three first terminals 40. The two first terminal groups 40G are arranged in a manner reversed from each other with respect to an axis extending in the first direction X. The first terminals 40, six in total, of the two first terminal groups 40G are arranged at first intervals P1.

The first terminals 40 in the first group of terminals 40G are each located at a different position in the first direction X. In the first terminal group 40G, the amount of the first terminal 40 embedded in the holding portion 31 in the first direction X is greater in the first terminals 40 that are located closer to one side in the second direction Y In other words, the projected amount from the holding portion 31 in the first direction is smaller in the first terminals 40 located closer to one side in the second direction Y Structure of Second Connector 60

The second connector 60 is attached to a motor case (not shown).

The second connector 60 has a second housing 70 that holds the second terminals 80. The second connector 60 includes, for example, six second terminals 80. The second terminals 80 are identical in shape and interchangeable.

Structure of Second Housing 70

The second housing 70 includes a holding portion 71 that holds the second terminals 80 and a tubular portion 72 that is tubular. The second housing 70 is formed of, for example, a resin material.

The holding portion 71 protrudes from the tubular portion 72 toward the outer side of the tubular portion 72. The holding portion 71 holds the second terminals 80 and parts of the electric wires 90 including the second connection portions 90B. The second terminals 80, which are connected to the electric wires 90, are integrated with the second housing 70 through insert molding. Therefore, each second connection portion 90B is embedded in the holding portion 71.

The tubular portion 72 includes a second opening 73 passing through the tubular portion 72. The second opening 73 is oval.

Structure of Second Terminal 80

As shown in FIG. 1, the second terminals 80, which project from the holding portion 71 into the second opening 73, are arranged in the second direction Y at second intervals P2. The second interval P2 is the distance in the second direction Y between the central axes of insertion holes 83, which will be described below. The first interval P1 differs from the second interval P2. In the present embodiment, the first interval P1 is smaller than the second interval P2.

The second terminal 80 includes a wire connection portion 81 and a terminal connection portion 82. The second terminal 80 is a single component in which the electric wire connection portion 81 and the terminal connection portion 82 are formed integrally. The second terminal 80 is formed of, for example, a metal material such as copper, copper alloy, aluminum, aluminum alloy, or stainless steel.

The wire core 91 of an electric wire 90 is electrically connected to the electric wire connection portion 81.

The terminal connection portion 82 includes an insertion hole 83 extending through the terminal connection portion 82 in the third direction Z. The insertion hole 83 has a circular shape. The axial direction of the insertion hole 83 corresponds to the direction in which the second opening 73 extends through the terminal connection portion 82. When viewed in the third direction Z, the insertion hole 83 is entirely overlapped with the second opening 73.

The second terminals 80 are electrically connected to metal mating terminals arranged inside the motor case (not shown). The second terminal 80 and the corresponding mating terminal are fastened together by a bolt (not shown).

Second Terminal Group 80G

The second connector 60 includes one or more second terminal groups 80G of the second terminals 80. The second connector 60 of the present embodiment includes two second terminal groups 80G, each including three second terminals 80. The two second terminal groups 80G are arranged in a manner reversed from each other around with respect to an axis extending in the first direction X. The second terminals 80, six in total, of the two second terminal groups 80G are arranged at second intervals P2. A first terminal group 40G is electrically connected to a second terminal group 80G by three electric wires 90.

The second terminals 80 in the second terminal groups 80G are arranged next to one another in the second direction Y. The second terminals 80, six in total, of the two second terminal groups 80G are arranged next to one another in the second direction Y. Therefore, the second connection portions 90B of the electric wires 90 connected to the two second terminal groups 80G are arranged next to one another in the second direction Y.

Structure of Wire Harness 10

Figure 3:
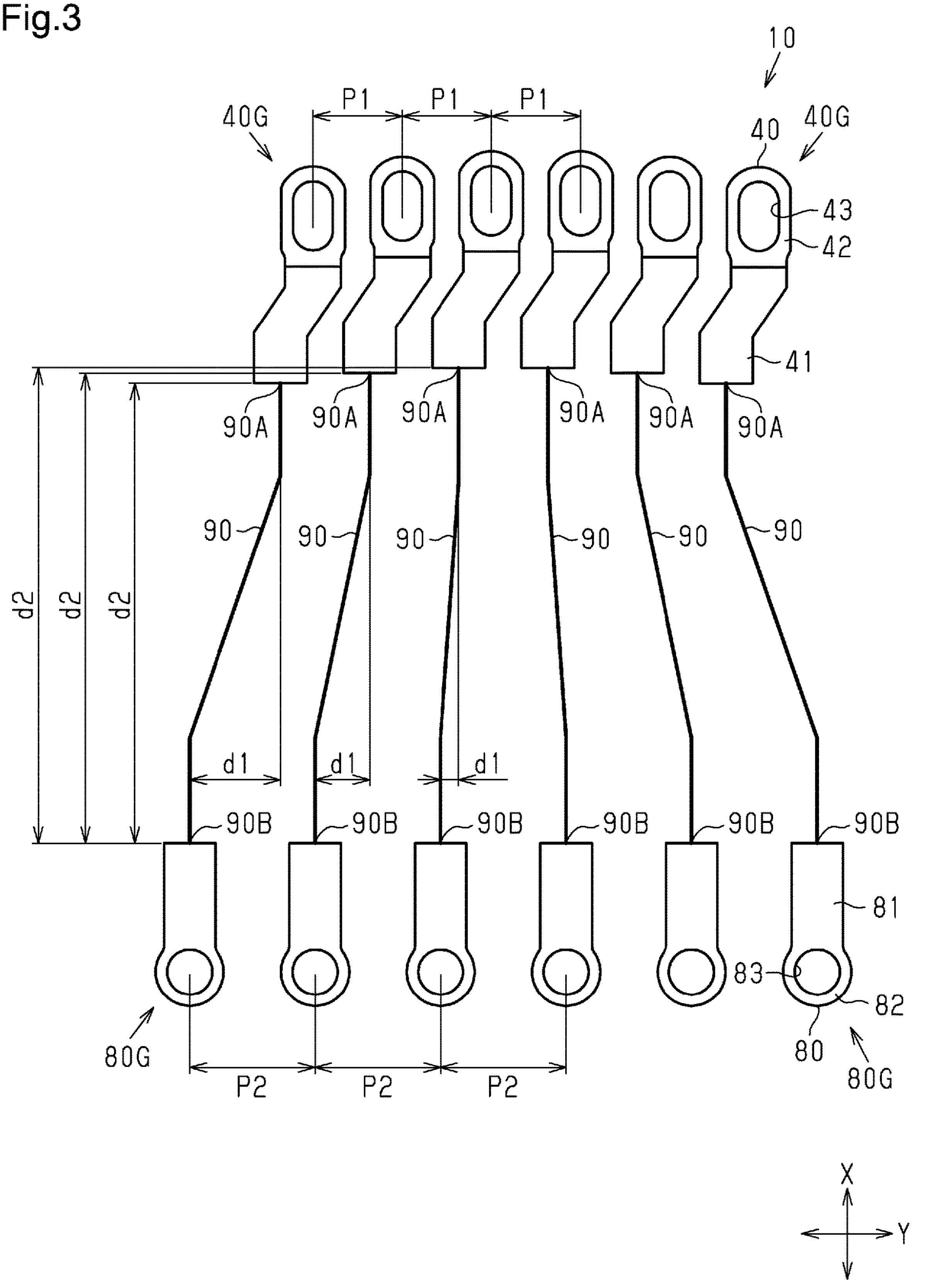
FIG. 3 is a schematic diagram of the wire harness according to the embodiment.

The structure of the wire harness 10 will now be described more specifically with reference to FIG. 3. FIG. 3 is a schematic diagram illustrating the positional relationship of the first terminals 40, the second terminals 80, and the electric wires 90. In FIG. 3, the interval in the second direction Y between the first connection portion 90A and the second connection portion 90B corresponding to the first connection portion 90A is referred to as interval d1. In addition, the interval in the first direction X between the first connection portion 90A and the second connection portion 90B corresponding to the first connection portion 90A, is referred to as interval d2.

As described above, the first interval P1 is smaller than the second interval P2. Further, the second connection portions 90B are arranged next to one another in the second direction Y. In the electric wires 90 connected to the first terminal group 40G, the first connection portions 90A that are located closer to one side in the second direction Y are arranged at positions closer to the corresponding second connection portions 90B in the first direction X. More specifically, the first connection portions 90A are arranged so that interval d1 increases as interval d2 decreases.

Interval d1 and interval d2 are set for each of the electric wires 90 so that the electric wires 90 have the same length. Connection of the first terminals 40 and the second terminals 80 with the electric wires 90 of the same length will determine the interval d1 and the interval d2 for each of the electric wires 90.

As described above, the mating terminals 110 are arranged next to one another in the second direction Y. Thus, in the first terminal group 40G, the first terminals 40 are located at different positions relative to the corresponding mating terminals 110 in the first direction X. Therefore, as shown in FIG. 1, in the first terminal group 40G, the first terminals 40 are located at different positions in the first direction X relative to the corresponding bolts 130, which are arranged next to one another in the second direction Y.

The operation of the present embodiment will now be described.

Figure 4:
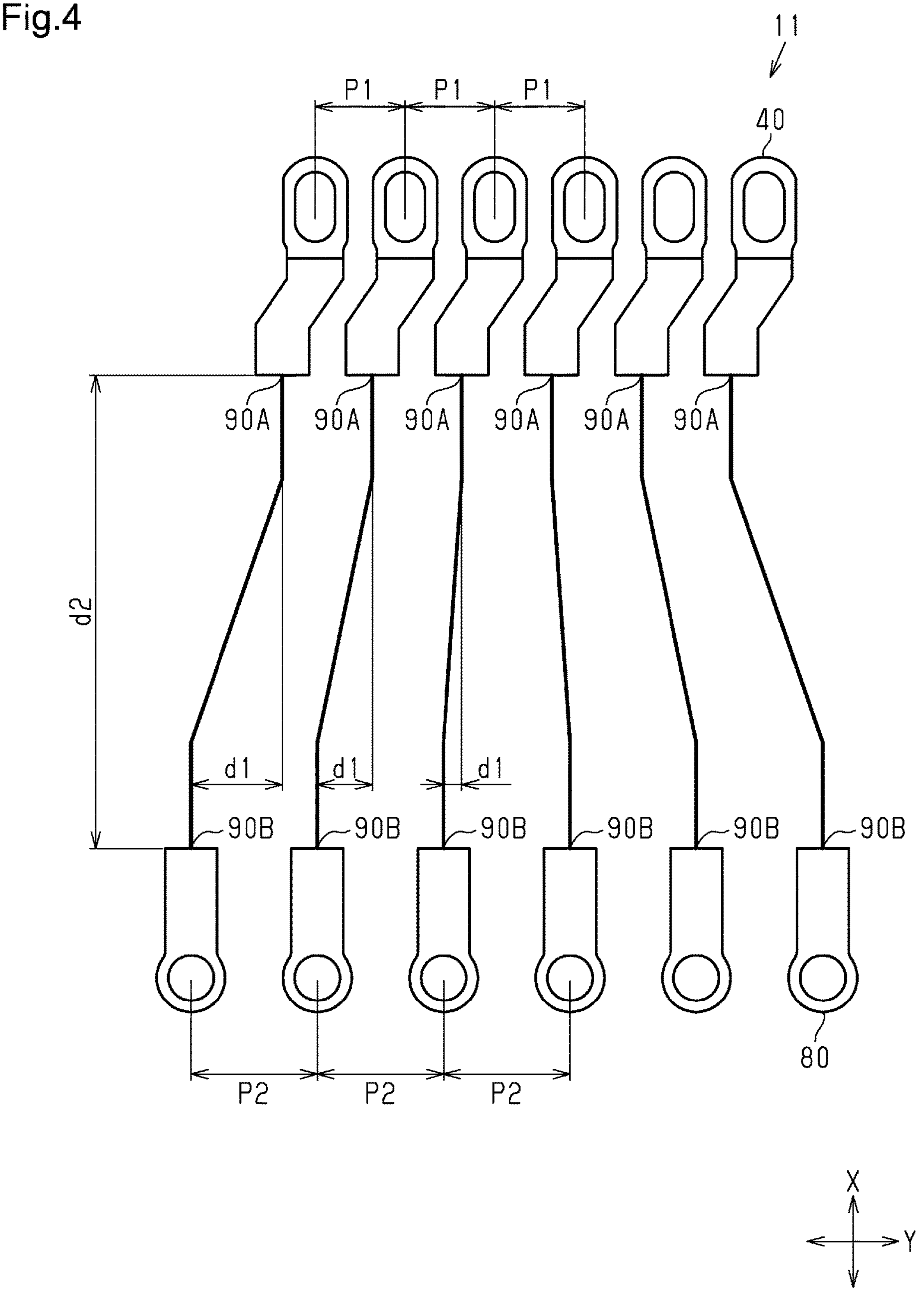
FIG. 4 is a schematic diagram of a wire harness of a comparative example.

The structure of a wire harness 11 in a comparative example will now be described with reference to FIG. 4. In the wire harness 11, the first interval P1 is smaller than the second interval P2, and the first connection portions 90A and the second connection portions 90B are both aligned in the second direction Y. Thus, in the wire harness 11, the interval d2 is the same for each electric wire 90 although the interval d1 is different. Therefore, in the wire harness 11, the length of the electric wire 90 increases as the interval d1 increases.

As shown in FIG. 3, in the wire harness 10 of the present embodiment, the electric wires 90 have the same length. In addition, the first connection portion 90A, of which the interval d1 from the corresponding second connection portion 90B in the second direction Y is longer, is arranged at a position closer to the corresponding second connection portion 90B in the first direction X. The position of each first connection portion 90A is set in this manner to allow the electric wires 90 of the same length to be used in the wire harness 10. The advantages of the embodiment will now be described.

(1) The first terminals 40 are arranged in the second direction Y at first intervals P1, and the second terminals 80 are arranged in the second direction Y at second intervals P2. The first interval P1 differs from the second interval P2. The electric wires 90 have the same length. Each electric wire 90 includes the first connection portion 90A, which is connected to the corresponding first terminal 40, and a second connection portion 90B, which is connected to the corresponding second terminal 80. The second connection portions 90B are arranged next to one another in the second direction Y. The first connection portions 90A, of which the interval from the corresponding second connection portion 90B is longer in the second direction Y, are arranged at positions closer to the corresponding second connection portions 90B in the first direction X.

Such a structure minimizes the number of component types in the wire harness 10.

(2) The distal end 42*c* of each first terminal 40 projects out of the first opening 33 in the third direction Z.

With such a structure, the distal end 42*c* of each first terminal 40 projects out of the first opening 33. This improves the working efficiency when connecting the first terminals 40 to the mating terminals 110.

(3) The insertion hole 43 of each first terminal 40 is an elongated hole that is elongated in the first direction X.

With such a structure, when joining the mating terminal 110 and the first terminal 40 with the bolt 130, the position of the first terminal 40 relative to the mating terminal 110 may be changed in the first direction X. This allows the first terminals 40 to be connected to the mating terminals 110, which are arranged next to one another in the second direction Y, even when the first connection portion 90A are located at different positions in the first direction X. This absorbs differences in the positions of the first terminals 40 in the first direction X resulting from differences in the first interval P1 and the second interval P2.

Further, with the structure described above, for example, even in a case where the lengths of the electric wires 90 vary within the range of the manufacturing tolerance, the elongated holes of the first terminals 40 absorbs the variation. Therefore, the mating terminal 110 and the first terminal 40 can be properly connected to each other.

(4) The first terminals 40 are identical in shape and interchangeable.

With such a structure, multiple types of the first terminals 40 do not have to be prepared. This allows the same type of first terminals 40 to be used, and the same type of electric wire 90 to be used. Thus, the number of component types in the wire harness 10 can be further reduced.

(5) The first interval P1 is smaller than the second interval P2.

Such a structure limits enlargement of the first housing 30 in the second direction Y. Therefore, enlargement of the first connector 20 in the second direction Y is limited.

(6) The first connection portions 90A are embedded in the holding portion 31 of the first housing 30, and the second connection portions 90B are embedded in the holding portion 71 of the second housing 70.

Such a structure imparts water resistance between the electric wires 90 and the first housing 30, and between the electric wires 90 and the second housing 70.

(7) The first connector 20 is electrically connected to the inverter. The second connector 60 is electrically connected to the motor. The electric wires 90 are high-voltage electric wires to which high voltage is applied.

With such a structure, the wire harness 10 can be applied to a conductive path between the inverter and the motor to which high voltage is applied.

Modified Example

The present embodiment can be modified and practiced as described below. The present embodiment and the following modified examples can be implemented in combination with each other as long as there is no technical contradiction.

The electric wires 90 may be low-voltage electric wires to which low voltage is applied.

In the present embodiment, the first connector 20 is applied to a connector that is electrically connected to the inverter, and the second connector 60 is applied to a connector electrically connected to the motor. Alternatively, the second connector 60 may be applied to a connector electrically connected to the inverter, and the first connector 20 may be applied to a connector electrically connected to the motor.

The first connection portion 90A and the second connection portion 90B do not have to be embedded in the first housing 30 and the second housing 70, respectively. In this case, for example, sealing members that seal the gaps between the holding portions 31 and 71 and the electric wires 90 can be arranged in the holding portions 31 and 71, which are configured to allow for insertion of the electric wires 90.

The first interval P1 may be larger than the second interval P2. In this case, the first connection portions 90A, of which the interval d1 *f* from ones of the corresponding second connection portions 90B is longer in the second direction Y, are arranged at positions closer to the corresponding second connection portions 90B in the first direction X.

The first terminals 40 may have a different shape. For example, the length of the first terminal 40 in the first direction X can be increased when the connected electric wire 90 has a smaller interval d2. In this case, the positions of the distal ends 42*c* of the first terminals 40 can be aligned in the second direction Y. In addition, the positions of the insertion holes 43 can be aligned in the second direction Y.

The insertion hole 43 can be omitted from the first terminal 40. In this case, for example, a pin-shaped male terminal may be employed as the first terminal 40, and a female terminal into which the male terminal is inserted may be employed as the mating terminal 110. This modification can be applied in the same manner to the second terminal 80.

The insertion hole 43 of the first terminal 40 may have a circular shape. In this case, the mating terminal 110 may be arranged at a position corresponding to the position of the insertion hole 43. Further, in this case, the mating terminal 110 may also include an elongated hole that is elongated in the first direction X.

The distal end 42*c* of each first terminal 40 may be located inside the first opening 33 of the first housing 30. In this case, in a state where the first connector 20 is attached to the case 100, the mating terminal 110 is positioned inside the first opening 33.

The number of the first terminals 40 in the first terminal group 40G and the number of the second terminals 80 in the second terminal group 80G may be changed.

The first connector 20 may include additional terminals that differ from the first terminals 40. In the same manner, the second connector 60 may include additional terminals that differ from the second terminals 80. In this case, the electric wires 90 connecting such terminals do not need to have the same length as the electric wires 90 connecting the first terminals 40 and the second terminals 80.

The first interval P1 of the embodiment may be referred to as a first equal interval, and the second interval P2 may be referred to as a second equal interval that is shorter than the first equal interval.

For example, the first housing 30 may hold the first terminals 40 in a fixed state such that the flat distal ends 42*c*, which include the insertion holes 43, of the terminal connection portions 42 of the first terminals 40 are aligned on a certain virtual plane and are spaced apart from one another by the first interval P1. For example, the second housing 70 may hold the second terminals 80 in a fixed state such that the plate-shaped terminal connection portions 82 including the insertion holes 83 of the second terminals 80 are aligned on a certain virtual plane and are spaced apart from one another by the second interval P2.

For example, the first housing 30 may hold the first terminals 40 in a fixed state such that the wire connection portions 41 of the first terminals 40 and the first connection portions 90A of the wires 90 are aligned on a certain virtual plane and are spaced apart from one another by the first interval P1. For example, the second housing 70 may hold the second terminals 80 in a fixed state such that the wire connection portions 81 of the second terminals 80 and the second connection portions 90B of the electric wires 90 are aligned on a certain virtual plane and are spaced apart from one another by the first interval P2.

As shown in FIGS. 1 and 2, when the first connector 20 is viewed in the direction in which the first opening 33 extends through the first housing 30, the wire connection portion 41 of each first terminal 40 may have an opening into which the first connection portion 90A of the electric wire 90 is inserted in a direction (e.g., the first direction X) orthogonal to the arrangement direction of the first terminals 40 (e.g., the second direction Y). In addition, when the second connector 60 is viewed in the direction in which the second opening 73 extends through the second housing 70, the wire connection portion 81 of the second terminals 80 may have an opening into which the second connection portion 90B of the electric wire 90 is inserted in a direction (e.g., the first direction X) orthogonal to the arrangement direction of the second terminals 80 (e.g., the second direction Y).

As shown in FIGS. 1 and 3, when the first connector 20 is viewed from the direction in which the first opening 33 extends through the first housing 30, lines connecting the openings into which the first connection portions 90A of the wire connection portions 41 are inserted do not have to be straight and may be, for example, arcuate. When the second connector 60 is viewed in the direction in which the second opening 73 extends through the second housing 70, lines connecting the openings into which the second connection portions 90B of the wire connection portions 81 are inserted may be straight.

As shown in FIGS. 1 and 3, when the first connector 20 is viewed in the direction in which the first opening 33 extends through the first housing 30, in the direction orthogonal to the arrangement direction of the first terminals 40, the length of the insertion hole 43 of the first terminal 40 may be greater than the length of the bolt 130 inserted into the insertion hole 43, and the line connecting the centers of the bolts 130 may be straight.

The number of first terminals 40 does not have to be the same as the number of second terminals 80, and the electric wires 90 do not have to overlap one another.

The length from the first connection portion 90A to the second connection portion 90B may be the same in all of the electric wires 90.

REFERENCE SIGNS LIST d1) interval
d2) interval
P1) first interval
P2) second interval
X) first direction
Y) second direction
Z) third direction
10) wire harness
11) wire harness
20) first connector
30) first housing
31) holding portion
32) tubular portion
33) first opening
34) groove
40) first terminal
40G) first terminal group
41) wire connection portion
42) terminal connection portion
42*a*) basal end
42*b*) intermediate part
42*c*) distal end
43) insertion hole
50) plate
51) attaching hole
52) sealing member
60) second connector
70) second housing
71) holding portion
72) tubular portion
73) second opening
80) second terminal
80G) second terminal group

81) wire connection portion
82) terminal connection portion
83) insertion hole
90) electric wire
90A) first connection portion
90B) second connection portion
91) wire core
92) insulating coating
100) case
101) opening
110) mating terminal
111) through hole
120) nut
130) bolt

The invention claimed is:

1. A wire harness, comprising:

a first connector including a first housing and first terminals, the first housing including a first opening, and the first terminals being held by the first housing;

a second connector including a second housing and second terminals, the second housing including a second opening, and the second terminals being held by the second housing; and electric wires connecting the first terminals and the second terminals, respectively, wherein the first terminals project into the first opening in a first direction, which is a direction parallel to a projecting direction of the first terminals, and are arranged next to each other at a first interval in a second direction that is orthogonal to the first direction, and the second terminals project into the second opening in the first direction and are arranged next to each other at a second interval in the second direction, the first interval differs from the second interval, the electric wires have the same length, the electric wires include first connection portions, respectively connected to the first terminals, and second connection portions, respectively connected to the second terminals, the second connection portions are arranged next to each other in the second direction, for each of the electric wires, a second direction distance is defined as a distance between the first connection portion and the corresponding second connection portion in the second direction, while a first direction distance is defined as a distance between the first connection portion and the corresponding second connection portion in the first direction, and for each electric wire, the first connection portion is arranged so that as the second direction distance increases, the first direction distance decreases.

2. The wire harness according to claim 1, wherein:

each of the first terminals includes a distal end connected to a mating terminal; and the distal end projects from the first opening in a third direction that is orthogonal to both the first direction and the second direction.

3. The wire harness according to claim 1, wherein:

each of the first terminals includes an insertion hole into which a bolt is inserted for connection with a mating terminal; and the insertion hole is an elongated hole that is elongated in the first direction.

4. The wire harness according to claim 1, wherein the first terminals are identical in shape.

5. The wire harness according to claim 1, wherein the first interval is smaller than the second interval.

6. The wire harness according to claim 1, wherein:

the first connection portions are embedded in the first housing; and the second connection portions are embedded in the second housing.

7. The wire harness according to claim 1, wherein:

one of the first connector and the second connector is electrically connected to an inverter;

the other of the first connector and the second connector is electrically connected to a motor; and the electric wires are high-voltage electric wires to which high voltage is applied.

8. A wire harness, comprising:

a first connector including a first housing and first terminals, the first housing including a first opening, and the first terminals being held by the first housing, a second connector including a second housing and second terminals, the second housing including a second opening, and the second terminals being held by the second housing; and electric wires connecting the first terminals and the second terminals, respectively, wherein the first terminals project into the first opening in a first direction, which is a direction parallel to a projecting direction of the first terminals, and are arranged next to each other at a first interval in a second direction that is orthogonal to the first direction, the second terminals project into the second opening in the first direction and are arranged next to each other at a second interval in the second direction, the first terminals are identical in shape, the first interval differs from the second interval, the electric wires include first connection portions, respectively connected to the first terminals, and second connection portions, respectively connected to the second terminals, the second connection portions are arranged next to each other in the second direction, for each of the electric wires, a second direction distance is defined as a distance between the first connection portion and the corresponding second connection portion in the second direction, while a first direction distance is defined as a distance between the first connection portion and the corresponding second connection portion in the first direction, and for each electric wire, the first connection portion is arranged so that as the second direction distance increases, the first direction distance decreases.

* * * * *